(12) United States Patent
Klatt et al.

(10) Patent No.: US 11,667,070 B2
(45) Date of Patent: Jun. 6, 2023

(54) DEVICE FOR PRODUCING CONTAINERS BY BLOW MOULDING

(71) Applicant: KHS GmbH, Dortmund (DE)

(72) Inventors: Dieter Klatt, Hamburg (DE); Thorsten Herklotz, Ahrensburg (DE); Werner Lesinski, Ahrensburg (DE); Günther Godau, Hamburg (DE); Jens-Uwe Haubenschild, Hamburg (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 17/048,585

(22) PCT Filed: Jun. 25, 2019

(86) PCT No.: PCT/EP2019/066862
§ 371 (c)(1),
(2) Date: Oct. 17, 2020

(87) PCT Pub. No.: WO2020/002347
PCT Pub. Date: Jan. 2, 2020

(65) Prior Publication Data
US 2021/0170664 A1    Jun. 10, 2021

(30) Foreign Application Priority Data
Jun. 25, 2018 (DE) .................... 10 2018 115 189.6

(51) Int. Cl.
*B29C 49/48* (2006.01)
*B29C 49/64* (2006.01)
(Continued)

(52) U.S. Cl.
CPC .......... *B29C 49/4823* (2013.01); *B29C 49/64* (2013.01); *B29C 49/786* (2013.01);
(Continued)

(58) Field of Classification Search
CPC ... B29C 49/4823; B29C 49/64; B29C 49/786; B29C 2049/4876; B29C 2949/78663;
(Continued)

(56) References Cited

U.S. PATENT DOCUMENTS

2005/0000959 A1   1/2005 Kagan
2009/0218733 A1   9/2009 Andison et al.
(Continued)

FOREIGN PATENT DOCUMENTS

CN      102358016   *   8/2011   ............. B29C 45/73
DE    502004004147 T2     10/2007
(Continued)

OTHER PUBLICATIONS

International Search Report dated Sep. 12, 2019 filed in PCT/EP2019/066862.

*Primary Examiner* — Galen H Hauth
*Assistant Examiner* — Shibin Liang
(74) *Attorney, Agent, or Firm* — Rankin, Hill & Clark LLP (57) ABSTRACT

The invention relates to a device for producing containers (22) by blow molding, with at least one temperature-controllable blow mold (21) held by a mold holder (20), namely with a bottom insert held by a bottom mold carrier and/or with mold inserts held by mold half carriers, and is characterized by an inductive heating device, which indirectly heats the bottom insert and/or the mold inserts by means of induction.

20 Claims, 5 Drawing Sheets

(51) Int. Cl.
  *B29C 49/78*  (2006.01)
  *B29K 67/00*  (2006.01)
  *B29L 31/00*  (2006.01)

(52) U.S. Cl.
  CPC ...... *B29C 49/78* (2013.01); *B29C 2049/4876* (2013.01); *B29K 2067/003* (2013.01); *B29L 2031/7158* (2013.01)

(58) Field of Classification Search
  CPC .......... B29C 2949/78848; B29C 49/08; B29C 45/73; B29C 45/78; B29C 49/78; B29K 2067/003; B29L 2031/7158; B29B 13/02
  See application file for complete search history.

(56) References Cited

U.S. PATENT DOCUMENTS

| | | | |
|---|---|---|---|
| 2012/0052147 A1 | 3/2012 | Stoiber et al. | |
| 2013/0037996 A1 | 2/2013 | Fuhrer | |
| 2013/0189385 A1* | 7/2013 | Zoppas | B29B 13/02 425/3 |
| 2013/0207319 A1 | 8/2013 | Haesendonckx et al. | |
| 2016/0375624 A1 | 12/2016 | Culeron et al. | |

FOREIGN PATENT DOCUMENTS

| | | | | |
|---|---|---|---|---|
| DE | 102011116192 A1 | 4/2012 | | |
| EP | 2422956 A2 | 2/2012 | | |
| EP | 2556944 A2 | 2/2013 | | |
| JP | 2005335234 A | 12/2005 | | |
| JP | 201607490 A | * 10/2014 | ............. | B29C 49/48 |
| JP | 2016074090 A | 5/2016 | | |
| WO | 2009075791 A1 | 6/2009 | | |

* cited by examiner

Fig. 9 Detail F

DEVICE FOR PRODUCING CONTAINERS BY BLOW MOULDING

The invention relates to a device for producing containers by blow molding, with at least one temperature-controllable blow mold held by a mold holder. Such devices are referred to as blowing stations, which are used in blowing machines, e.g., with multiple such stations positioned on a rotating blowing wheel.

Containers, preferably bottles, made of a blow-moldable material, in particular plastic or PET, are made from preforms in special blow molds. A blow mold is held in a mold holder within a blowing station; see, for example, DE 10 2011 116 192 A1. The mold holder is also referred to as a mold carrier or outer shell and is preferably separated in two halves along a vertical plane, which halves are moved apart for accommodating the blow mold. The blow mold is also referred to as a blow mold insert or inner shell and is preferably formed in three parts, namely with two mold inserts and a bottom insert. The two mold inserts are also referred to as molding shells or mold halves and have a negative imprint of a bottle half (without bottom) in their interior space, for example. In blow molding, the blow mold insert must absorb the internal pressure that occurs during blow molding without opening up. This means that the blow mold insert must be held together by the mold holder. Furthermore, the blow mold insert must not deform. Accordingly, outer surfaces of the blow mold insert bear against the inner walls of the mold holder with as much of their surface as possible. The blow mold insert is preferably made of aluminum, or of stainless steel for special applications.

For precise temperature control during blow molding, it is known to temperature-control the mold holder; see, for example, EP 2 556 944 A2 and EP 2 422 956 A2. This allows for the blow mold insert to be controlled with regards to its temperature. This is particularly relevant in conjunction with a so-called relax method or hotfill method. Therein, hot liquids are bottled in PET bottles. For this purpose, the containers should be kept at a higher temperature for a certain time after blow molding, such that equalization processes can take place and the containers are not deformed during hot-filling. It is known to control the temperatures of the mold halves and the bottom mold differently, e.g., to heat only the mold halves to a higher temperature and to cool the bottom mold.

The problem underlying the invention is to create a device with a novel heating device for temperature-controlling the blow mold.

To solve this problem, the device includes at least one temperature-controllable blow mold held by a mold holder, namely with a bottom insert held by a bottom mold carrier and/or with mold inserts held by mold half carriers, and an inductive heating device, which indirectly heats the bottom insert and/or the mold inserts by means of induction. Accordingly, an inductive heating device is provided, as a special form of an electric heating device. Therein, according to the invention, the blow mold can be indirectly heated by means of induction. The basic principle of induction heating is known and is used, for example, in induction stovetops. Indirect heating is present in particular when the heating device is part of the mold holder, the heat generation takes place in components of the mold holder, and the heat is transferred from there to the blow mold. An inductor via a high-frequency magnetic field acts upon an adapter spaced apart from the inductor, which adapter heats up and in turn heats the blow mold without coming into direct contact with the container bearing directly against the blow mold. An immediate heating of the blow mold, distinct from the process described above, is present when the heat is generated directly in the blow mold. According to the invention, only the bottom mold may be equipped with an inductive heating device, for example, or only the mold halves, or both the bottom mold and the mold halves.

An advantage of the invention is that heating the mold halves is often executed by means of heating circuits in the prior art, for example by means of a circuit for hot water. The use of other heating fluids, e.g., oil, is also known. The bottom mold also is frequently connected to a cooling circuit for a coolant, e.g., water. The invention makes it possible, for example, to inductively heat the mold halves and only maintain the one cooling circuit for the bottom mold, while the second circuit, namely that for the heating liquid, can be eliminated. Thus, the device according to the invention is a device with inductive heating for the mold halves and with a coolant circuit for the bottom mold.

According to a further idea of the invention, the mold holder can have at least one inductor. The inductor is the core of an induction heater, namely the coil for generating a particularly high-frequency magnetic field, with which a current flow is induced in an electrical conductor. In principle, multiple inductors also can be provided adjacent to each other, on top of each other and/or successively. In this way, different areas can be temperature-controlled differently, depending on the control of the inductors. Thus, a preferential heating can also be realized within the blow mold, i.e., the targeted generation of a temperature profile in the circumferential direction and/or in the longitudinal direction of the blow mold. This is particularly possible if multiple inductors are arranged in a matrix arrangement (with multiple inductors both in the circumferential and in longitudinal direction of the mold holder) and, for example, current is applied to them in the appropriate manner, e.g., in groups.

According to a further idea of the invention, the inductor, preferably each of the multiple inductors, may have at least one coil with a coil axis at a right angle to an inner wall of the mold holder. The inner wall of the mold holder is curved in a manner corresponding to the outer contour of the blow mold. The coil axis then preferably extends at a right angle to a tangent at the curvature. This creates a magnetic field that is uniform relative to the blow mold contour. This allows for uniform heat generation and dissipation.

According to a further idea of the invention, the inner wall of the mold holder may be provided with a recess for accommodating the inductor, preferably with respective recesses each accommodating one of the inductors. The inductor is inserted into the recess from the inside, preferably with a precise fit. In addition, recesses may be provided for the cabling between adjacent inductors.

According to a further idea of the invention, the mold holder and/or the blow mold may be provided with at least one adapter, which can be inductively heated by the inductor, wherein preferably multiple adapters are provided, preferably also in a matrix arrangement analogous to the arrangement of the inductors described above. The adapter is or includes the electrical conductor in which flows the current induced by the high-frequency magnetic field of the inductor. The heat generated by induction is generated directly in the adapter. The adapter transfers the heat to the blow mold. Accordingly, the blow mold is indirectly heated by the adapter by means of induction.

According to a further idea of the invention, the adapter, preferably each of the multiple adapters, can form a part of the inner wall of the mold holder. The contour of the inner wall of the mold holder follows, among other factors, from the contour of the adapter, depending on the contour of the outer wall of the blow mold. Alternatively, the adapter, preferably each of the multiple adapters, can be part of the outer wall of the blow mold.

According to a further idea of the invention, the adapter, preferably each of the multiple adapters, can consist entirely, predominantly or partially of a ferromagnetic material. As a result, the adapter heats up particularly well.

According to a further idea of the invention, the mold holder may have at least one adapter layer on its inner wall, which adapter layer can be inductively heated. The adapter layer can also extend across the outer wall of the blow mold. Therein, the inner wall of the blow mold remains indirectly heated by means of induction.

The shape and arrangement of the inductor or of the multiple inductors are preferably adapted to the shape and arrangement of the adapter or of the multiple adapters. If multiple adapters are provided side by side, on top of each other and/or successively, in particular in a matrix arrangement, the inductors should also be arranged and shaped in an associated manner. This would, for example, favor the targeted generation of a temperature profile in the circumferential direction and/or in the longitudinal direction of the blow mold, by applying current to the inductors in an appropriate manner, e.g. in groups, in order to achieve desired different heating outputs for generating the temperature profile.

According to a further idea of the invention, the adapter layer can consist entirely, predominantly or partially of a ferromagnetic material. Advantageously, it is a ferromagnetic sheet metal.

According to a further idea of the invention, the mold holder may have at least one heat insulating area on its inner wall, preferably an insulating layer. When using an adapter layer, the heat insulating area is still below the adapter layer, i.e., between the adapter layer and the inner wall of the mold holder. When multiple distributed adapters are arranged, a heat insulating area is preferably located between adjacent adapters. The aim is to thermally insulate the mold holder against the blow mold. The heated blow mold should not transfer the heat back to the mold holder. The thermally insulating area may preferably consist of one or multiple layers and may also contain cavities or air layers. For example, an insulator may be arranged between the inductor and an associated adapter, or an air gap may remain, e.g., or both. Preferably, the insulator layer is cut to fit the required area and arranged between adjacent inductors, such that it leaves open the areas on which the inductors are mounted.

According to a further idea of the invention, the mold holder and/or the blow mold may consist entirely, predominantly or partially of a non-ferromagnetic material, in particular of aluminum. Preferably, the adapter and/or the adapter layer are exempt from this.

The problem underlying the invention also is to provide a method for producing containers by blow molding, in particular in conjunction with a method, preferably a relax method or hotfill method, in which the containers are filled with heated or hot liquid, wherein the containers are made from preforms in a blow mold, and wherein the blow mold is temperature-controlled before, during and/or after the forming of the containers. It is provided, according to the invention, that the blow mold is indirectly heated by means of induction. In this case, indirectly means that a mold holder for the blow mold is inductively heated and then transfers the heat to the blow mold. An inductor via a high-frequency magnetic field acts upon an adapter spaced apart from the inductor, which adapter heats up and in turn heats the blow mold without coming into direct contact with the container bearing directly against the blow mold.

Further features of the invention follow from the remaining description and from the claims. Advantageous exemplary embodiments of the invention are explained in more detail below on the basis of drawings. The drawings show:

FIG. 10 A sectional view through the representation in FIG. 8 along the line G-G FIG. 11 An exploded representation of another exemplary embodiment Without limiting the general applicability, the exemplary embodiments refer to mold halves, although the invention also relates to bottom inserts and their bottom mold carriers in the same way.

Figure 1:
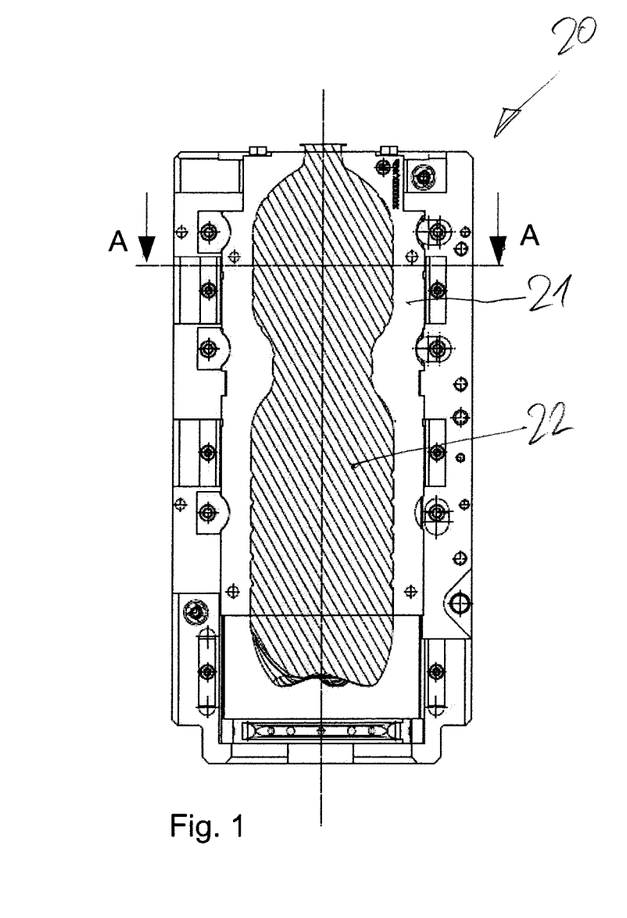
FIG. 1 A vertical interior view of one mold holder half with mold insert and container (PET bottle)

Shown in FIG. 1 is an interior view of a mold holder half 20 as part of a mold holder (not shown in detail here), with a mold insert 21 as part of a blow mold and with a container accommodated in the mold insert, namely a bottle 22, produced from a preform made of PET.

Figure 2:
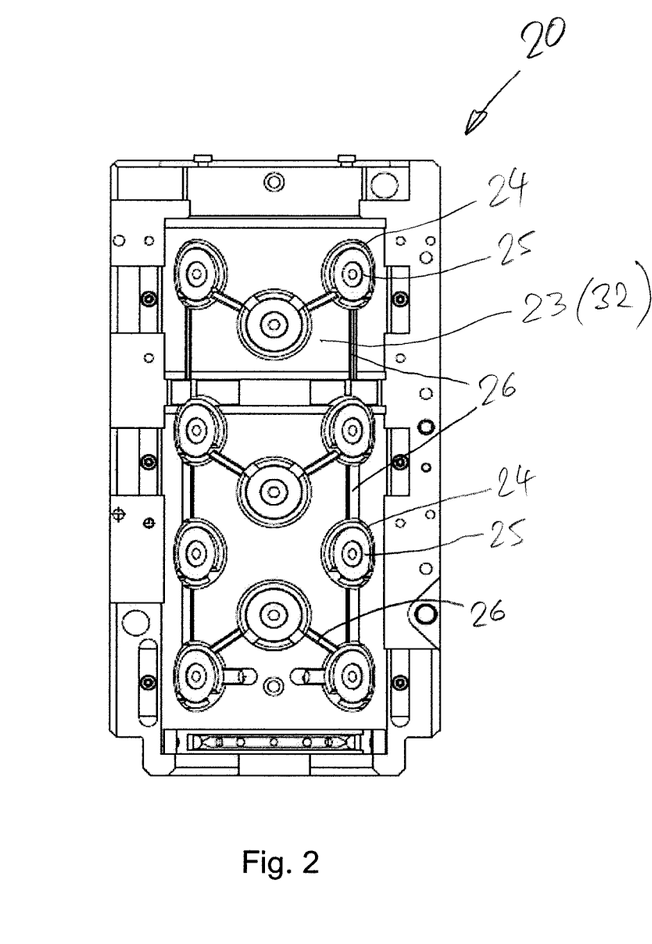
FIG. 2 The mold holder half according to FIG. 1, but without mold insert and container FIG. 3 A sectional view through the representation in FIG. 1 along the line A-A FIG. 4 A detail B from FIG. 3

FIG. 2 shows the same half of the mold insert 20, but without the mold insert 21 and without the bottle 22. It shows recesses 24 provided in a concave, curved inner wall 23 of the mold holder half 20, with respective inductors 25 inserted in each recess 24 as part of an induction heating device.

In this embodiment, a total of 11 inductors 25 are inserted into the inner wall 23. The aim is to generate and distribute heat as evenly as possible while optimizing the wiring required for this purpose. Therefore, another number of inductors also is possible. At the same time, a targeted control of the inductors 25 makes it possible to heat different areas differently, for example to achieve a so-called preferential heating, i.e., the generation of a desired temperature profile in the circumferential and/or longitudinal direction of the mold halves.

Partially, cable channels 26 are embedded into the inner wall 23 between adjacent inductors 25, as recesses extending in a straight line.

Figure 3:
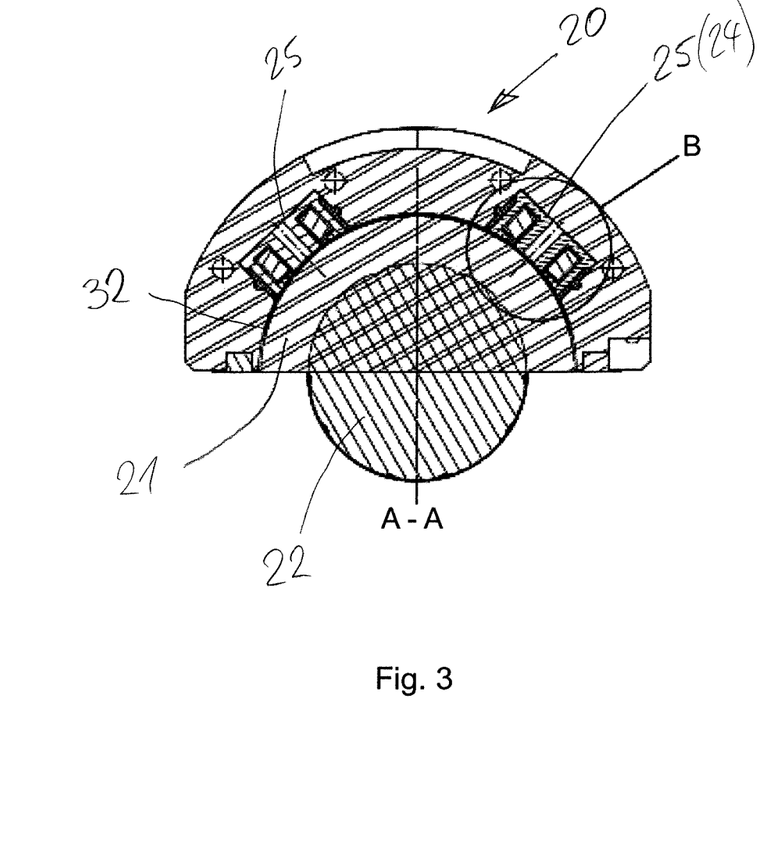
Figure 4:
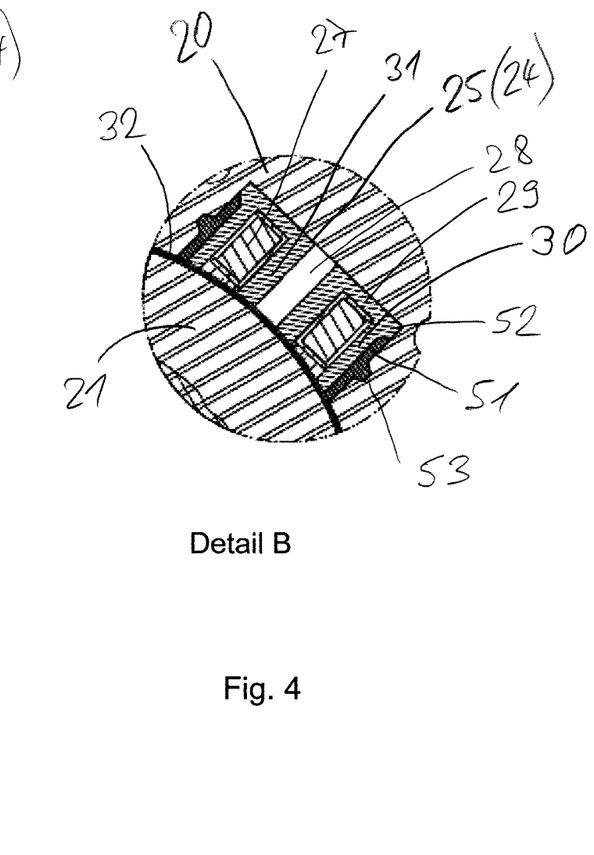

A first embodiment of the inductor 25 is shown in FIGS. 3 and 4. It has a coil 27, which is positioned in a coil container 28. The coil container 28 is made of ferrite and in addition to a bottom 29 and a circumferential outer wall 30 also has a hollow core 31. In this way, an open receptacle for the coil 27, which is open toward the mold insert 21, is formed between the outer wall 30 and the core 31.

Preferably, the inductor 25 is sealed with a sealing compound 51 and thus not accessible. For this purpose, the inductor 25 has an in particular circumferential collar 52 at the bottom 29, while a space outside the collar 52 is filled with the sealing compound 51. In addition, the recess 24 in the area of the sealing compound 51 has a circumferential groove 53 or another radially oriented recess for accommodating a part of the sealing compound 51, resulting in a form fit against an axial movement of the inductor 25.

In this first embodiment of the inductor 25, the outer wall 30 and the core 31 are matched to the curvature of the inner wall 23. In this case, an adapter layer 32 is provided as a component of the inner wall 23 as a finishing and visible layer. It is made of ferromagnetic material. A current flow is induced in the adapter layer 32 as soon as a high-frequency voltage is applied to the coil 27.

An air gap (not represented in detail) of preferably about 0.5 mm is present between the inductor 25 and the adapter layer 32. In addition to the inductor 25, a thermal insulating layer or a thermal insulating area (not shown in detail here) is provided between the adapter layer 32 and the mold holder half 20.

To ensure the best possible heat transfer, the mold insert 21 entirely bears against the adapter layer 32, and preferably consists of a non-ferromagnetic material, for example of aluminum or an aluminum alloy, as does the mold holder half 20. Aluminum is unfavorable or even unsuitable as a material for the adapter or for the adapter layer due to its low electrical resistance.

The fact that the adapter layer 32 extends over almost the entire inner wall 23 of the mold holder half 20 results in a very good heat distribution and transfer to the mold insert 21.

Figures 5, 6:
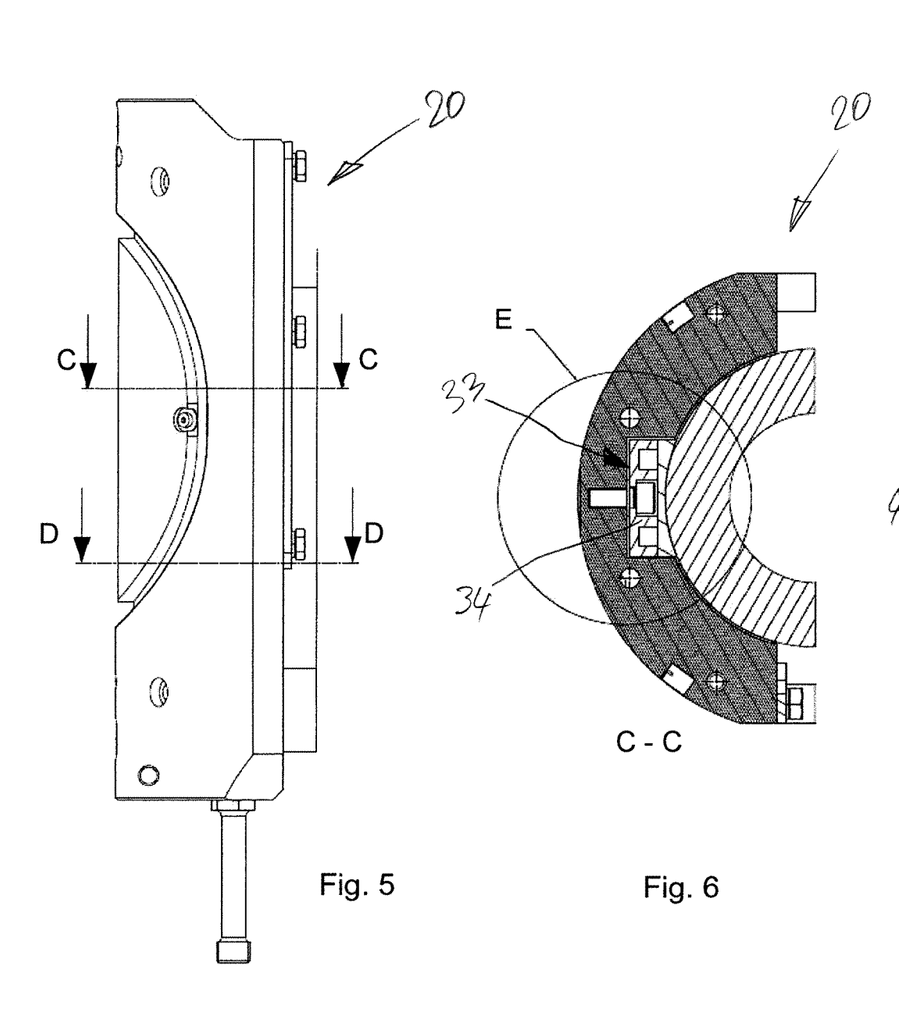
FIG. 5 The mold holder half according to FIG. 2, but in a view rotated by 90° (side view)
FIG. 6 A sectional view through the representation in FIG. 5 along the line C-C
Figure 7:
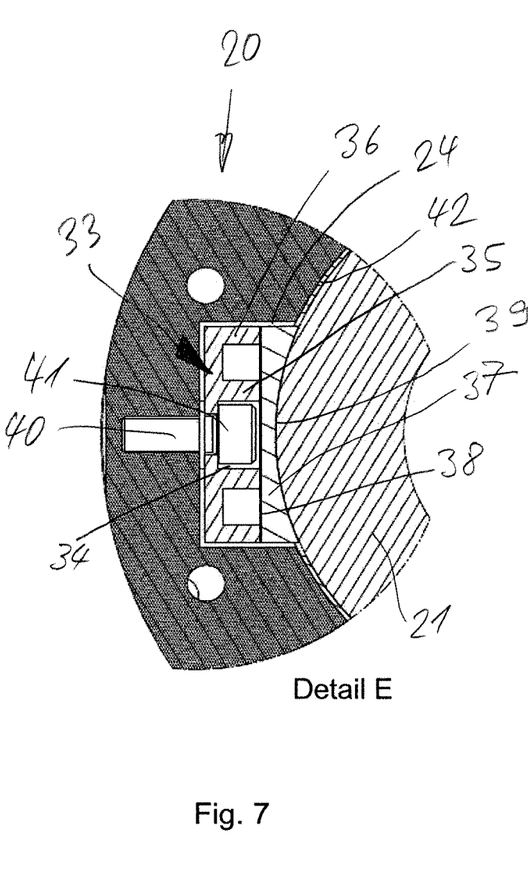
FIG. 7 The detail E from FIG. 6

FIGS. 5, 6, 7 show a second embodiment, namely an inductor 33 in another design. Again, a coil (not shown) is provided in a coil container 34. The core 35 and the outer wall 36 are not matched to the outer contour of the mold insert 21. Rather, the inductor 33 has the rectangular cross-section shown in FIG. 7.

An adapter 37 is provided for matching the outer contour of the mold insert 21 and for generating the heat, which adapter 37 is positioned in the recess 24 on the inductor 33 and in particular is sealed there. Therein, an air gap 38 of preferably about 0.5 mm is again present between the inductor 33 and the adapter 37.

The adapter 37 has the same outer diameter as the inductor 33. A curved wall 39 of the adapter 37 opposite the air gap 38 bears against the outer contour of the mold insert 21, such that a good heat transfer is guaranteed.

In this second embodiment, the inductor 33 is attached with a bolt 40 in the center of the recess 24. Therein, a bolt head 41 is positioned in the core 35.

In this second embodiment, the mold insert 21 on its inner side is provided with a thermally insulating area or an insulating layer 42 outside the recesses 24, which thermally insulating area or layer can bear against the outer contour of the mold insert 21. This significantly reduces a heat transfer from the heated mold insert 21 back to the mold holder half 20.

Figure 8:
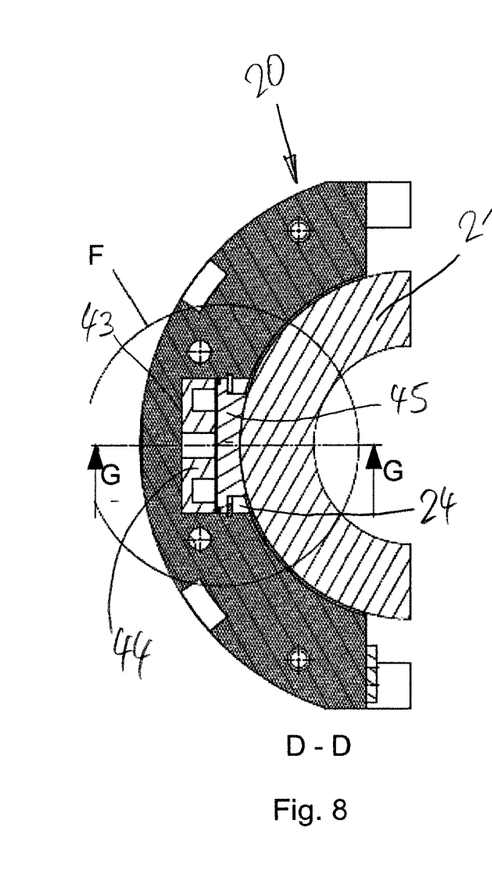
FIG. 8 A sectional view through the representation in FIG. 5 along the line D-D
Figure 9:
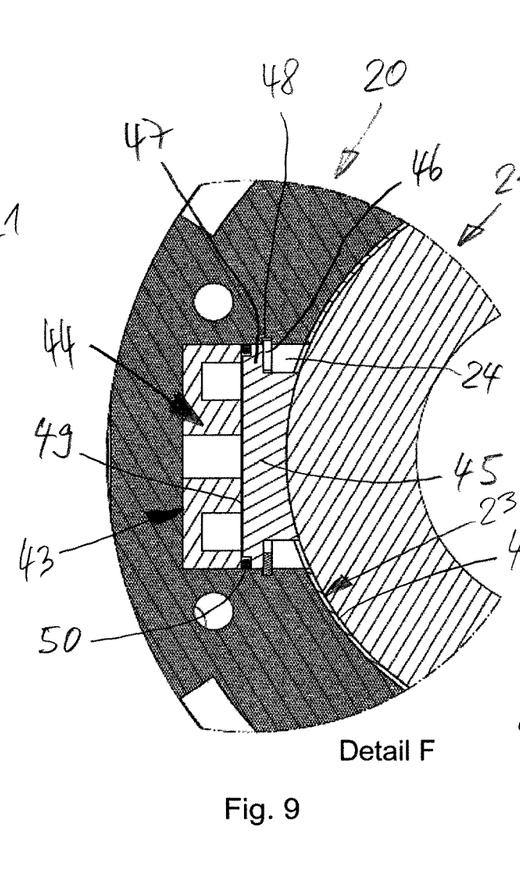
FIG. 9 The detail F from FIG. 8
Figure 10:
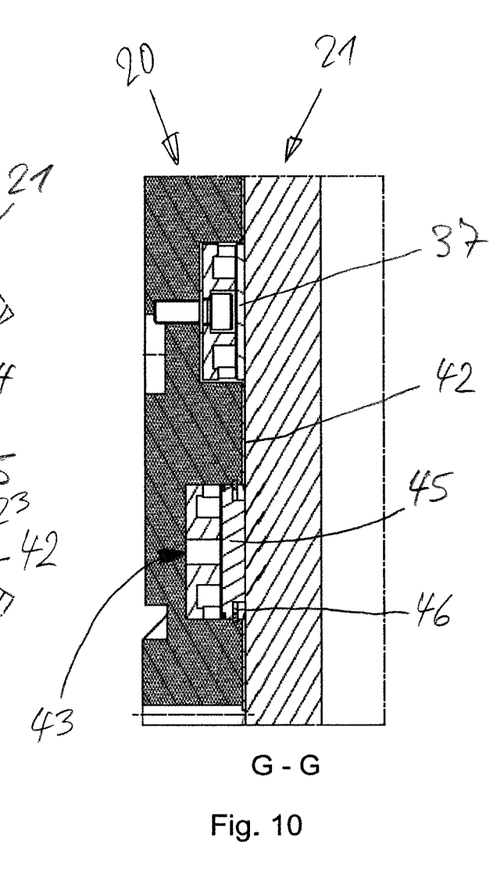

A third embodiment of an inductor 43 is explained on the basis of FIGS. 8 to 10. It, like the inductor 33 of the second embodiment, has a coil container 44 with a rectangular cross-section. An adapter 45 also is provided, analogous to the adapter 37. However, the adapter 45 is held here by a snap ring 46, which on the one hand bears against a collar 47 surrounding the adapter 45 and facing the coil container 44, and on the other hand is held in a circumferential groove 48 in the recess 24. Again, an air gap 49 of preferably 0.5 mm is provided between adapter 45 and coil container 44 In addition, a circlip 50 is arranged between the adapter 45 and the coil container 44 in the area of the air gap 49. The circlip 50 is elastic in the axial direction, pushes the adapter 45 against the mold insert 21 and is preferably an elastomer.

The snap ring 46 limits the possible axial stroke of the adapter 45. Without a mold insert 21 bearing against it, the adapter 45 slightly protrudes from the recess 24 or above the inner wall 23 due to the pressure of the spring ring 50.

FIG. 10 shows the inductor 33 of the second embodiment and the inductor 43 of the third embodiment on top of each other. The advantage of these two embodiments lies in the use of relatively simple inductors, which are available cost-effectively in large quantities. The adaptation to the special purpose intended here is executed by means of the specially designed and arranged adapters 37, 45.

As shown in connection with the preceding exemplary embodiments, the adapters 37, 45 and the adapter layer 32 are each associated with the mold holder or the mold holder half 20. The arrangement of the adapter layer 32 on the mold holder half 20 has the advantage that the latter is closed off in the area of its inner wall 23. Alternatively, in an exemplary embodiment not shown here, the mold insert 21 has an adapter or an adapter layer on its side facing the mold carrier, in which a current is generated by means of the inductor 25, 33, 43. The advantage of this version lies in the reliable contact against the mold insert, which leads to a faster and more-direct heating of the mold insert 21. For example, the mold insert 21 consists of aluminum and on its outside, namely on the side facing the mold carrier, has an adapter layer of sheet steel, analogous to the adapter layer 32. It is important to have a sufficient and precisely defined air gap or a distance between the inductor and the adapter layer created by an insulating material.

Figure 11:
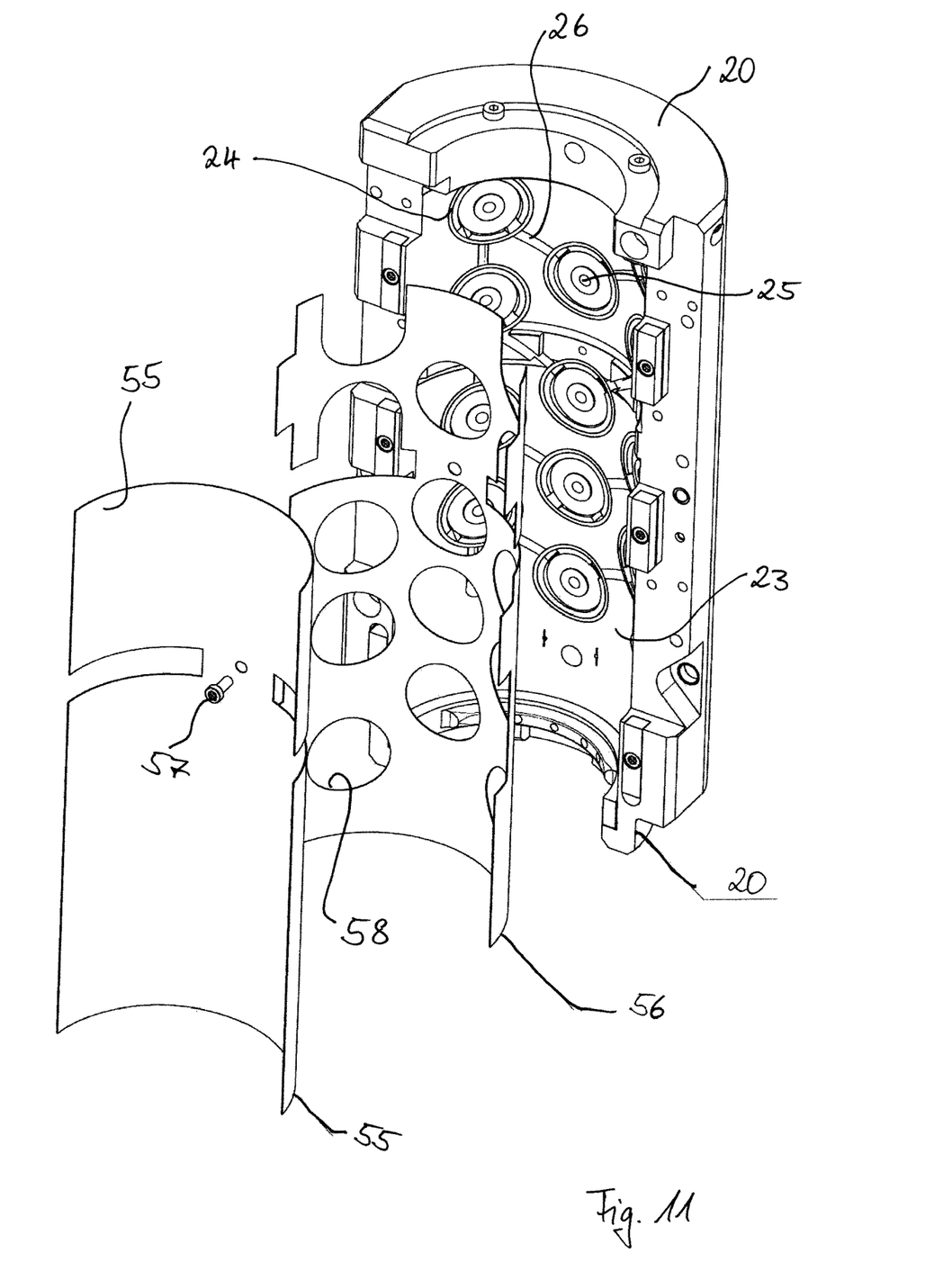

FIG. 11 shows another exemplary embodiment in an exploded view. As in the previous embodiments described above, inductors 25 are embedded in the inner wall 23 of the mold holder half 20. The adapter, to which a magnetic field is applied by these inductors 25, is shown in the example shown here as a curved adapter plate 55 following the contour of the inner wall 23 of the mold holder half 20, which adapter plate 55 is designed to be thermally separate from the mold holder half 20, namely by arranging a custom-cut insulator 56 in between the two. The adapter plate 55 can be screwed onto the mold holder half 20 with the custom-cut insulator 56 arranged between them, e.g., by means of a screw. Not shown is the mold insert 21, which would connect to the adapter plate 55 and would make thermal contact with this adapter plate 55. The custom-cut insulator 56 is also formed in a curve to follow the contour of the inner wall 23 of the mold holder half 20, and has recesses 58, in order to be able to leave the inductors 25 uncovered in its mounted state. A custom-cut insulator 56 without such recesses 58 could also be used, for example if the insulator material largely allows the high-frequency magnetic field generated by the inductor 25 to pass through unattenuated, similar or identical to an air gap, as it was provided between the inductor and the adapter in the previously described exemplary embodiments. In the preceding exemplary embodiments, the air gap could also be replaced by insulators made of a suitable material. The exemplary embodiment shown in FIG. 11 has considerable assembly advantages, as both the adapter plate 55 and the custom-cut insulator 56 can be quickly assembled.

The invention claimed is:

1. A device for producing containers by blow molding comprising:
   at least one temperature-controllable blow mold held by a mold holder, wherein the blow mold and the mold holder include a bottom mold insert held by a bottom mold carrier and/or mold half inserts held by mold half carriers; and an inductive heating device;
wherein the mold holder includes a plurality of inductors, which are arranged at a distance to each other, as the inductive heating device,
wherein the plurality of inductors are arranged in a matrix with two or more inductors in a circumferential direction and two or more inductors in a longitudinal direction of the mold holder,
wherein the mold holder and/or the blow mold is/are provided with a plurality of adapters, which are arranged at a distance to each other and are configured to be directly heated by means of induction by the plurality of inductors,
wherein the bottom mold insert held by the bottom mold carrier and/or the mold half inserts held by the mold half carriers is/are configured to be indirectly heated by means of induction via heat transferred from the plurality of adapters, which are configured to be directly heated by means of induction by the plurality of inductors, and
wherein the device is a blowing station of a blowing machine arranged on a rotary driven blowing wheel.

2. The device according to claim 1, wherein each of the plurality of inductors has at least one coil with a coil axis at a right angle to an inner wall of the mold holder.

3. The device according to claim 1, wherein an inner wall of the mold holder is provided with a plurality of recesses, each of said plurality of recesses for accommodating a respective one of the plurality of inductors.

4. The device according to claim 1, wherein the plurality of adapters form a part of the inner wall of the mold holder or a part of the outer wall of the blow mold.

5. A device for producing containers by blow molding comprising:
at least one temperature-controllable blow mold held by a mold holder, wherein the blow mold and the mold holder include a bottom mold insert held by a bottom mold carrier and/or mold half inserts held by mold half carriers; and
an inductive heating device;
wherein the mold holder and/or the blow mold is/are provided with at least one adapter, which is configured to be directly heated by means of induction by the inductive heating device,
wherein the mold holder includes a plurality of inductors, which are arranged at a distance to each other, as the inductive heating device,
wherein the plurality of inductors are arranged in a matrix with two or more inductors in a circumferential direction and two or more inductors in a longitudinal direction of the mold holder,
wherein the bottom mold insert held by the bottom mold carrier and/or the mold half inserts held by the mold half carriers is/are configured to be indirectly heated by means of induction via heat transferred from the at least one adapter, which is configured to be directly heated by means of induction by the inductive heating device, and
wherein the device is a blowing station of a blowing machine arranged on a rotary driven blowing wheel.

6. The device according to claim 1, wherein the plurality of adapters are comprised of a ferromagnetic material.

7. The device according to claim 1, wherein the mold holder has at least a heat insulating area on its inner wall.

8. The device according to claim 1, wherein the mold holder has at least a heat insulating area on its inner wall, said heat insulating area comprising an insulating layer that covers an area between adjacent inductors.

9. The device according to claim 1, wherein the mold holder and/or the blow mold are comprised of a non-ferromagnetic material.

10. The device according to claim 9, wherein the non-ferromagnetic material is aluminum.

11. The device according to claim 1, wherein the inductive heating device is provided for the mold half inserts and the device further comprises a coolant circuit for the bottom mold insert.

12. The device according to claim 1, wherein individual inductors of the plurality of inductors are controlled for different heating outputs.

13. The device according to claim 12, wherein the individual inductors are controlled for different heating outputs in groups.

14. The device according to claim 5, wherein the at least one adapter is comprised of a ferromagnetic material.

15. The device according to claim 5, wherein the at least one adapter forms a part of the inner wall of the mold holder or a part of the outer wall of the blow mold.

16. The device according to claim 5, wherein the mold holder on its inner wall, or the blow mold on its outer wall, has at least one adapter layer configured to be inductively heated.

17. The device according to claim 16, wherein the adapter layer is comprised of a ferromagnetic material.

18. A blowing machine for producing containers by blow molding, with multiple devices according to claim 1.

19. The blowing machine according to claim 18, wherein the multiple devices are arranged on a rotary driven blowing wheel.

20. A method for producing containers by blow molding, wherein the containers are made from preforms in a blow mold, and wherein the blow mold is temperature-controlled before, during and/or after the forming of the containers, wherein the blow mold is indirectly heated by means of induction using a device according to claim 1.

* * * * *